Jan. 27, 1948.  D. A. QUARLES  2,434,957
ACOUSTIC INDICATOR FOR DIRECTIONAL RECEIVERS
Filed April 19, 1944
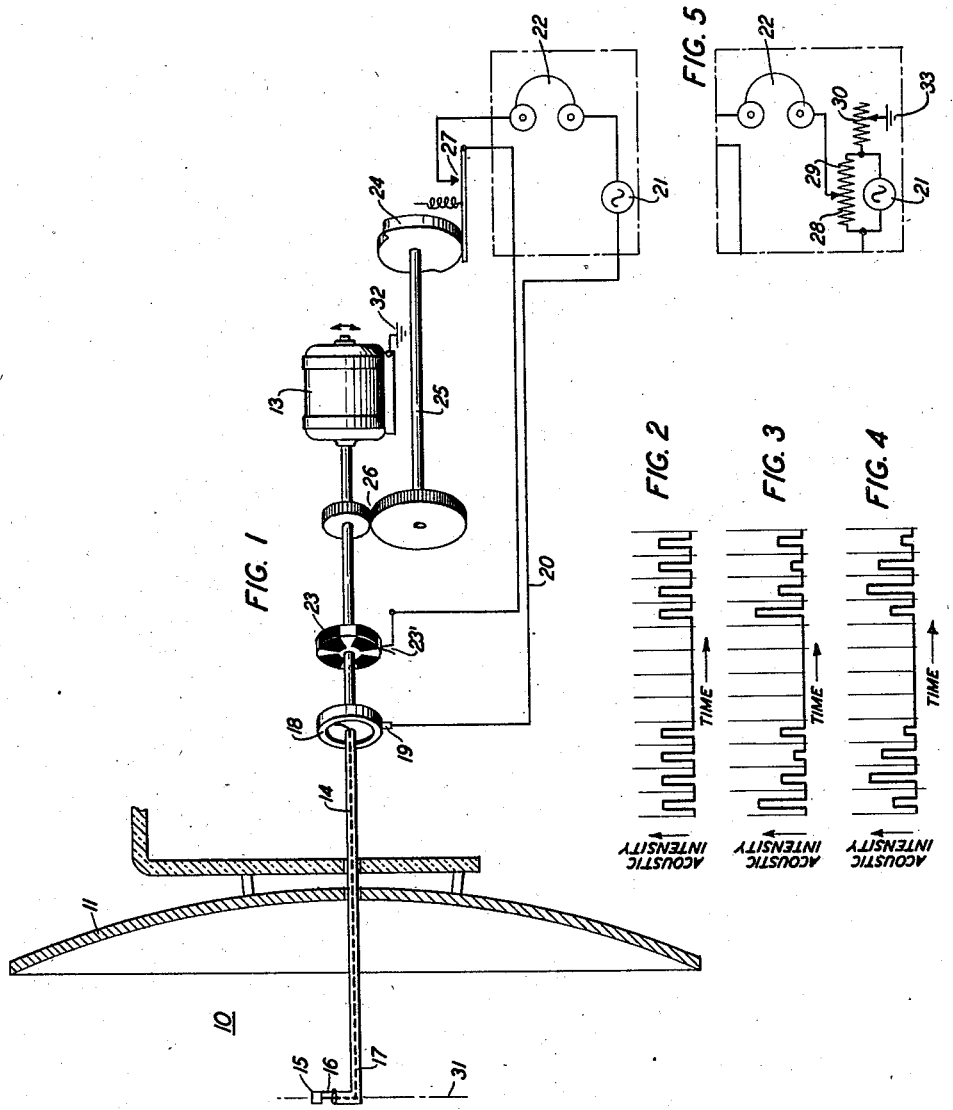
INVENTOR
D. A. QUARLES
BY
Franklin Mohr
ATTORNEY Patented Jan. 27, 1948

2,434,957

UNITED STATES PATENT OFFICE 2,434,957

ACOUSTIC INDICATOR FOR DIRECTIONAL RECEIVERS

Donald A. Quarles, Englewood, N. J., assignor to Bell Telephone Laboratories, Incorporated, New York, N. Y., a corporation of New York Application April 19, 1944, Serial No. 531,704

8 Claims. (Cl. 250—11)

This invention relates to directionally selective radiant energy receiving systems and more particularly to an acoustic indicating device to facilitate the operation of pointing a directionally selective receiver toward a source of incoming waves.

In systems of direction finding and object location, it is common to use conical scanning or two-dimensional lobe switching in association with a cathode ray display device as a means for the precise determination of the direction of a source of radiant energy or of a reflecting object. There have also been suggested certain acoustic indicating means for making such determinations. The present invention is directed to an improved acoustic indicator for use with conical or other cyclic scanning systems or with lobe switching systems. Deviation from correct pointing of the receiving antenna in the system of the invention is indicated by an amplitude modulation or variation in the amplitude of the response of the acoustic system over the scanning or switching cycle. The variations in response give rise to characteristic rhythms, a particular rhythm being correlated with a deviation in a particular direction. In a preferred embodiment of the invention, the acoustic response is interrupted to form a series of pulses, for example, a group of four, separated by a silent interval. Other numbers of pulses per group may be employed, if desired, or the acoustic response may be more or less continuous. Incorrect pointing is indicated by a rhythmical rise and fall in the acoustic intensity. Some device such as the introduction of the recurring silent interval may be employed to enable the observer to associate the accent of the rhythm or the accented pulse as the case may be, with a particular portion, for example, quadrant, of the scanning motion. The position of the accent indicates the quadrant in which the maximum signal is received and this information enables the operator to correct the pointing of the receiving antenna until all pulses are received in equal intensity, indicating that the axis of the scanning receiver is accurately directed towards the radiation source.

In the drawing,

Fig. 1 is a schematic representation of a preferred embodiment of the invention;

Fig. 2 is a graphical representation of the acoustic response in the system of Fig. 1, when the receiving antenna is accurately pointed toward the source of radiation;

Figs. 3 and 4 are graphical representations of the acoustic response of the system when incorrectly pointed; and Fig. 5 shows an alternative circuit arrangement which may be substituted for the portion of the system of Fig. 1 shown within a dot-dash line.

In Fig. 1, a directionally selective arrangement 10 for receiving and detecting radiant energy is illustrated as comprising a paraboloidal reflector 11 and an eccentrically mounted, rotatable thermistor or bolometer 15 which may be rotated by a motor 13 through a shaft 14. By a thermistor is meant a resistor which exhibits a marked or material variation in resistance as a function of its temperature. The thermistor 15 preferably rotates in the focal plane of the reflector 11, which plane is located as indicated in the drawing by a dot-dash line 31. The rotation of the thermistor 15 serves to effect conical scanning in a manner similar to a more elaborate arrangement which is disclosed in a copending application of P. H. Smith, Serial No. 498,622, filed August 14, 1943, and assigned to the same assignee as the present application. The Smith arrangement utilizes a quarter-wave antenna instead of the thermistor 15 of the system illustrated herein in Fig. 1. If desired, the quarter-wave antenna or other suitable tuning means may be used in the system of Fig. 1 when a wave of single frequency is received, in which case the thermistor may be placed at a point in the tuning system where the heating effect is a maximum.

Let it first be assumed that radiation is being received from the direction of the axis of the shaft 14, that is, that the receiving arrangement 10 is correctly pointed in the direction of the incoming waves. Rotation of the thermistor 15 along with the shaft 14 then causes no fluctuation in the intensity of the radiant energy reflected to the thermistor 15 by the reflector 11, as will be evident from the rotational symmetry of the system through which the energy is transmitted to the thermistor. The thermistor in this case is irradiated by radiant energy of unvarying intensity and maintains a constant resistance substantially unaffected by the rotation.

The electrical circuit of the thermistor 15 will now be traced, beginning with a lead 16 preferably connecting one terminal of the thermistor with the conductive material of the shaft 14, which shaft may be composed partly or wholly of metal. The other terminal of the thermistor is connected by an insulated lead 17 which preferably passes through the interior of the shaft 14 and is in turn connected to a slip ring 18. A brush 19 is maintained in constant contact with the slip ring 18. The brush 19 is connected by a lead 20 to a series circuit comprising a source 21 of electromotive force of audible frequency, an acoustic receiver 22 represented by head-phones and thence through two circuit interrupters in series to return to contact with the conductive material of the shaft 14. One of the interrupters is shown as comprising a preferably narrow contactor 23' bearing upon a commutator 23 having four conductive segments all connected conductively with the conductive portion of the shaft 14 and separated at the periphery of the commutator by insulating segments. The other interrupter is operated suitably by means of a cam 24 driven by an auxiliary shaft 25 preferably through a 2 to 1 reduction gearing 26 and controls a contact 27.

With each revolution of the shaft 14 the commutator 23 closes its contact once for each quadrant. The cam 24 controls the contact 27 to hold the circuit open during alternate complete revolutions of the shaft 14. Between interruptions at the contact 27 the commutator 23 produces a sequence of four pulses during which the audible tone from the source 21 is applied to the receiver 22 through the circuit which has been described. In the assumed condition of correct pointing of the receiving device, the pulses in the acoustic receiver 22 are of equal intensity as represented graphically in Fig. 2. If desired, the commutator 23 may be replaced by a permanent connection, in which case the acoustic response is unmodulated except for the interruptions caused by the contact 27.

In the general case where the system 10 is incorrectly pointed, which case will now be considered, the radiation reaching the thermistor 15 from the reflector 11 varies cyclically during each revolution of the shaft 14. The heating effect of the radiation upon the thermistor 15 will vary accordingly during the cycle, resulting in a rhythmical variation of the temperature of the thermistor and a corresponding variation of the instantaneous value of its resistance. Accordingly, one of the pulses in each cycle in the receiver will be of greater intensity than the others, and a particular rhythm will be introduced into the response, as illustrated graphically in Fig. 3 or Fig. 4, to give only two examples. If the commutator 23 is not used, the acoustic response is a tone undergoing a continual amplitude modulation in the intervals between the interruptions caused by the contact 27. Use of the commutator 23 to produce four pulses in a group, as illustrated, gives a rhythm corresponding to four-four time in musical notation, with the position of the accented beat depending upon which quadrant produces the greatest response in the thermistor 15. Some expedient such as the insertion of the silent interval between groups of four pulses, introduced by the contact 27, is necessary to enable the operator to distinguish between rhythms such as the two shown in Figs. 3 and 4, respectively, which are identical except for a time displacement and could not otherwise be distinguished by audible observation. It will be readily understood that the operator may correlate the particular rhythm of Fig. 3, for example, with an error of pointing of the device too high in elevation, and the rhythm of Fig. 4, for example, with pointing to the right of the source. By properly altering the pointing of the device, a condition may be reached in which the pulses are all of equal intensity, as illustrated in Fig. 2, indicating that the pointing of the axis of the reflector 11 is precisely in the direction of the incoming radiation. The correlation between the accented beat and the quadrant of maximum response may be controlled in several ways that will be evident to one skilled in the art, a convenient way being by adjusting the angular position of the contactor 23' on the shaft 14 with respect to the element 15.

The system of Fig. 1 will respond with pulses even though no radiation is being received and in some cases this may be undesirable. To obviate this condition, a bridge circuit may be employed as shown in Fig. 5, the bridge comprising fixed resistance arms 28 and 29, the thermistor 15 and a variable resistor or rheostat 30. The acoustic receiver 22 and the source 21 are connected to the bridge diagonals in conjugate relation to each other as shown. The interrupters are shown in the same diagonal with the receiver in Fig. 5, but, if desired, the receiver and the source may be interchanged, or the interrupters may be placed in the same diagonal in which the source is shown in Fig. 5. Ground connections 32 and 33 complete the electrical circuit through the shaft 14 to the thermistor 15 and commutator 23.

In the arrangement of Fig. 5, when substituted in the system of Fig. 1, the bridge may be balanced by adjusting the rheostat 30 in the absence of radiation or with the receiver pointed in the direction of minimum radiation. When increased radiation is received, the thermistor 15 changes its resistance, thereby unbalancing the bridge and enabling current to flow through the receiver 22 whenever the circuit is closed at the interrupters. The intensity of the response is substantially proportional to the radiation reaching the element 15.

The shaft 14 may pass through suitable openings and bearings in the reflector 11 and in the supporting structure. Means may be provided as is well known in the art for turning the reflector and associated equipment to point the axis of the reflector 11 in any desired direction. The thermistor 15 may be supported by means of sufficient rigidity in the lead 16 or 17 or both, or in any other suitable manner.

It will be evident that any suitable scanning antenna system may be substituted for that illustrated, the particular scanning system used not forming an essential part of the present invention.

Furthermore it will be evident that the scanning system 10 together with the commutator 23 and contactor 23' constitutes a particular example of a lobe switching arrangement. Any other suitable lobe switching system may be employed instead, the particular form used being again no essential part of the invention.

Many other variations of the system illustrated will occur to those skilled in this art. The radiation received can be either steady or in the form of pulses and it may be either heterogeneous in frequency, as for example, infra-red radiation, or substantially a single frequency as in radio communication. If the received radiation occurs in pulses at a suitable audio rate, the audio frequency may be demodulated by means of a suitable receiver and the audio frequency component from the receiver supplied to the circuit in place of energy from the local source 21. In case the received radiation is unmodulated, the system of Fig. 1 may be employed, or, alternatively, the received radiation may be rectified and broken up by means of a commutator and used in place of the current from the source 21 or to control a local source such as the source 21. When a local source is thus controlled, the output of the source 21 is modulated by the thermistor 15 and by the interrupter 27, but in this case the commutator 23 is inserted in the output circuit of the rectifier instead of directly in the circuit of the source 21 and receiver 22.

It will be evident also that two different audio frequencies might be controlled by separate commutators such as commutator 23, one for the azimuth correction and the other for the elevation correction. The two audio frequencies might be applied to separate earphones for the two ears and separately balanced by the operator.

The radiant energy sensitive element 15 has been described as a thermistor or bolometer; but it is to be understood that it is sufficient if the element 15 produces a resistance effect that varies as a function of the intensity of the radiant energy striking the element, whether the resistance variation is due to a temperature change in the element, or whether the resistance variation is caused by means other than temperature change. The variable resistance effect produced may reside in the element 15 or, if desired, in a separate circuit coupled to the element 15 in any suitable manner, as for example in a stationary circuit coupled to the element 15 through slip rings. In the latter case the element 15 may comprise a probe or antenna connected to a radio receiver, the antenna being preferably a quarter wavelength half-dipole extending radially from the shaft 14 and lying in the focal plane 31. In this case, the shaft is preferably modified to form a coaxial transmission line and the antenna mounted in accordance with the teachings of the above-cited application of P. H. Smith.

Wherever the term thermistor or bolometer is used in this specification or in the appended claims the term is intended to include any device which produces a resistance effect or amplitude of response that varies as a function of the intensity of the radiant energy received at a specified location.

Instead of interrupting the circuit periodically to obliterate alternate groups of pulses, other provision may be made for imparting a definite time position in the sequence to each audible pulse. For example, the first pulse of each group may be distinguished by a tone of different frequency from the rest or by two tones sounding together, in which case no silent interval is necessary. In general, any suitable means may be supplied to mark or identify acoustically a reference phase in the scanning cycle, the introduction of the silent cycle being a particular form of acoustic identification.

What is claimed is:

1. A directionally selective receiving system for radiant energy comprising means having a reference axis, said means functioning to scan cyclically over a range of directions symmetrically related to said reference axis, said scanning means including means for producing a response which varies in amplitude over the scanning cycle when the said reference axis is directed at a material angle with respect to a direction from which radiant energy is incoming, a source of audible waves, means to modulate the amplitude of the waves emitted from said source in accordance with the said variations in the response of said scanning means, and means substantially independent of duration and amplitude to provide an acoustic identification of a reference phase in the scanning cycle.

2. A directional system comprising wave receiving means having directional selectivity, means to orient said receiving means cyclically in a succession of directions symmetrically disposed with respect to a given movable axis, means to generate a recurrent sequence of audible pulses in response to waves intercepted by said receiving means in respective portions of said cycle of orientation, said individual pulses being substantially uniform in duration, and means independent of pulse duration and amplitude to identify acoustically a reference pulse in each recurring sequence of pulses.

3. A directionally selective receiving system for radiant energy comprising means having a reference axis, said means being for scanning cyclically over a range of directions symmetrically related to said reference axis, said scanning means including means for producing a response which varies over the scanning cycle when the reference axis is directed at a material angle with respect to a direction from which radiant energy is incoming, a source of audible waves, means to modulate the amplitude of the waves emitted by said source in accordance with the variations in the response of said scanning means, and means to suppress the emission of said audible waves throughout substantially the whole of alternate scanning cycles.

4. A directional system comprising wave receiving means having directional selectivity, means to orient said receiving means cyclically in a succession of directions symmetrically disposed with respect to a given movable axis, means to generate a recurrent sequence of audio frequency pulses in response to waves intercepted by said receiving means in respective portions of said cycle of orientation, acoustic means to detect amplitude variations among said pulses caused by a deviation of said movable axis from the direction of propagation of said intercepted waves and means independent of pulse duration and amplitude for acoustically distinguishing a reference pulse in each cycle of orientation of said receiving means, whereby a particular rhythm in the sequence of pulses may be correlated with a deviation of the said movable axis in a particular direction.

5. A directionally selective receiving system for radiant energy comprising means having a reference axis, said means being for scanning cyclically over a range of directions symmetrically related to said reference axis, said scanning means including means for producing a response which varies over the scanning cycle when the reference axis is directed at a material angle to a direction from which radiant energy is incoming, a thermistor actuated by the response of said scanning means, electrical means for generating audible waves, means controlled by said thermistor to modulate the amplitude of the waves emitted by said generating means in accordance with the variations in the response of said scanning means, and means independent of duration and amplitude for acoustically distinguishing the said response at a reference phase in the scanning cycle.

6. A directionally selective receiving system for radiant energy comprising means having a reference axis, said means being for scanning cyclically over a range of directions symmetrically related to said reference axis, said scanning means including means for producing a response which varies over the scanning cycle when the reference axis is directed at a material angle to a direction from which radiant energy is incoming, electrical means for generating audible waves, a variable resistor the resistance of which varies in accordance with the response of said scanning means, means serially connecting said generating means with said variable resistor, and a circuit interrupter included in said serial connection and actuated by said scanning means, whereby the said serial connection is interrupted during substantially the whole of alternate scanning cycles.

7. A directionally selective receiving system for radiant energy comprising means having a reference axis, said means being for scanning cyclically over a range of directions symmetrically related to said reference axis, said scanning means including means for producing a response which varies over the scanning cycle when the reference axis is directed at a material angle to a direction from which radiant energy is incoming, electrical means for generating audible waves, electrical means to modulate the amplitude of the audible waves emitted by said generating means in accordance with the variations in the response of said scanning means, a commutating device for breaking up the action of said generating means into a plurality of pulses, and means independent of pulse duration and amplitude for acoustically distinguishing a reference pulse in each scanning cycle.

8. A directionally selective receiving system for radiant energy comprising means having a reference axis, said means being for scanning cyclically over a range of directions symmetrically related to said reference axis, said scanning means including means for intercepting an amount of radiant energy which varies over the scanning cycle when the reference axis is directed at a material angle to a direction from which radiant energy is incoming, a bridge circuit having as one arm a resistor of resistance variable as a function of irradiation by radiant energy and exposed to the incoming radiant energy intercepted by said scanning means, said bridge circuit being initially balanced with said directionally selective receiving system directed to intercept minimum radiation, electrical means for generating audible waves, means controlled by unbalance of said bridge circuit induced by radiant energy reaching said variable resistor to modulate the amplitude of the waves emitted by said generating means in accordance with the degree of unbalance, and means independent of duration and amplitude for acoustically distinguishing the emitted waves at a reference phase in the scanning cycle.

DONALD A. QUARLES.